US008503166B2

(12) United States Patent
Murata

(10) Patent No.: US 8,503,166 B2
(45) Date of Patent: Aug. 6, 2013

(54) SOLID ELECTROLYTIC CAPACITOR

(75) Inventor: Kazuyoshi Murata, Neyagawa (JP)

(73) Assignee: SANYO Electric Co., Ltd., Moriguchi-shi (JP)

(*) Notice: Subject to any disclaimer, the term of this patent is extended or adjusted under 35 U.S.C. 154(b) by 46 days.

(21) Appl. No.: 13/338,635

(22) Filed: Dec. 28, 2011

(65) Prior Publication Data

US 2012/0176731 A1    Jul. 12, 2012

(30) Foreign Application Priority Data

Jan. 12, 2011 (JP) ................................. 2011-004330

(51) Int. Cl.
*H01G 9/00* (2006.01)

(52) U.S. Cl.
USPC ........... 361/523; 361/525; 361/528; 361/529; 361/517; 361/530

(58) Field of Classification Search
USPC ................. 361/523, 516, 517, 519, 525, 528, 361/529, 530, 540–541; 29/25.01, 25.03
See application file for complete search history.

(56) References Cited

U.S. PATENT DOCUMENTS

| | | | | |
|---|---|---|---|---|
| 6,751,086 B2* | 6/2004 | Matsumoto | .................... | 361/523 |
| 6,882,521 B2* | 4/2005 | Tsutsui et al. | ................ | 361/523 |
| 6,995,972 B2* | 2/2006 | Fujii et al. | ..................... | 361/540 |
| 7,184,257 B2* | 2/2007 | Kobayashi et al. | ........... | 361/540 |
| 7,190,571 B2* | 3/2007 | Heusmann et al. | ........... | 361/523 |
| 7,460,358 B2* | 12/2008 | Biler | .............................. | 361/523 |
| 8,254,087 B2* | 8/2012 | Ibata et al. | .................... | 361/540 |
| 8,279,583 B2* | 10/2012 | Zednicek et al. | ............. | 361/528 |

FOREIGN PATENT DOCUMENTS

JP    2008-091784 A    4/2008

* cited by examiner

*Primary Examiner* — Nguyen T Ha

(74) *Attorney, Agent, or Firm* — Westerman, Hattori, Daniels & Adrian, LLP

(57) ABSTRACT

A solid electrolytic capacitor includes a capacitor element, an anode terminal, and a cathode terminal. The capacitor element includes an anode body, and an anode member buried in the anode body. The anode member includes first and second anode components. At least a lower end portion of the first anode component is exposed at a lower surface of the anode body. The second anode component communicates with the first anode component and extends inside the anode body. The second anode component has a width greater than the width of the first anode component at least in a direction along the lower surface of the anode body. The anode terminal is electrically connected to the lower end portion of the first anode component. The cathode terminal is electrically connected to a cathode layer of the capacitor element at a position below the lower surface of the anode body.

6 Claims, 20 Drawing Sheets

SOLID ELECTROLYTIC CAPACITOR

INCORPORATION BY REFERENCE

Japanese patent application Number 2011-004330, upon which this patent application is based, is hereby incorporated by reference.

BACKGROUND OF THE INVENTION

1. Field of the Invention

The invention relates to a solid electrolytic capacitor.

2. Description of Related Art

FIG. 19 is a sectional view of an example of a conventional solid electrolytic capacitor. As shown in FIG. 19, the conventional solid electrolytic capacitor includes a lead-type capacitor element 81, an outer package member 82 covering the capacitor element 81, an anode terminal 83, and a cathode terminal 84. The capacitor element 81 includes an anode body 811 in the form of a rectangular parallelepiped, an anode lead 812 implanted in the anode body 811, a dielectric layer 813 formed on the outer circumference of the anode body 811, an electrolyte layer 814 formed on the dielectric layer 813, and a cathode layer 815 formed on the electrolyte layer 814. The anode and cathode terminals 83 and 84 are spaced apart from each other in a predetermined direction 89 (horizontal direction in the plane of FIG. 19). Part of a surface of the anode terminal 83 and part of a surface of the cathode terminal 84 are exposed at a lower surface 82a of the outer package member 82. These exposed surfaces of the anode and cathode terminals 83 and 84 form anode and cathode terminal surfaces 830 and 840 of the solid electrolytic capacitor respectively.

In the conventional solid electrolytic capacitor shown in FIG. 19, the capacitor element 81 is placed on the anode and cathode terminals 83 and 84 in such a posture that a pulled-out portion 812a of the anode lead 812 is pointed in the direction 89. The pulled-out portion 812a and the anode terminal 83 are electrically connected to each other through a conductive pillow member 85. Further, the cathode layer 815 and the cathode terminal 84 are electrically connected to each other through a conductive adhesive agent (not shown) provided therebetween. The solid electrolytic capacitor is given a current path 86 extending from the anode terminal surface 830 through the anode lead 812 to reach the cathode terminal surface 840.

In the conventional solid electrolytic capacitor shown in FIG. 19, the anode lead 812 is pulled out substantially through the center of a surface 811b as part of the outer circumference of the anode body 811 through which the anode lead 812 is implanted. So, the aforementioned posture of the capacitor element 81 places the pulled-out portion 812a at a position higher than a lower surface 811a of the anode body 811. To be specific, the pulled-out portion 812a is placed far above the anode terminal surface 830.

So, the conventional solid electrolytic capacitor finds difficulty in shortening the current path 86, placing limitations on reduction of ESL (equivalent series inductance) and/or ESR (equivalent series resistance).

It is preferable that the anode terminal 83 be placed near the pulled-out portion 812a in order to minimize the ESL and/or ESR of a solid electrolytic capacitor. So, if the pulled-out portion 812a is pointed in the direction 89 as in the conventional solid electrolytic capacitor (FIG. 19), the anode terminal 83 should be provided near the surface 811b of the anode body 811. As a result, design of the anode and cathode terminals 83 and 84 including arrangement of the anode and cathode terminals 83 and 84, and connections between the anode and cathode terminals 83 and 84 and the capacitor element 81, should be made with a low degree of freedom.

In addition, in the conventional solid electrolytic capacitor (FIG. 19), a surface of part of the anode lead 812 buried in the anode body 811 is electrically connected to the anode body 811. This makes a contact area between the anode body 811 and the anode lead 812 small so electrical resistance is easily generated between the anode body 811 and the anode lead 812. Also, in the conventional solid electrolytic capacitor (FIG. 19), a side surface of the pulled-out portion 812a is electrically connected to a tip end surface of the pillow member 85. This makes a contact area between the anode lead 812 and the pillow member 85 small so electrical resistance is easily generated between the anode lead 812 and the pillow member 85. So, in the conventional solid electrolytic capacitor, these electrical resistances place an obstacle to reduction of ESR.

SUMMARY OF THE INVENTION

A solid electrolytic capacitor of the invention includes a capacitor element, an outer package member covering the capacitor element, an anode terminal, and a cathode terminal. The capacitor element includes an anode body, an anode member buried in the anode body, a dielectric layer, an electrolyte layer formed on the dielectric layer, and a cathode layer formed on the electrolyte layer. The anode member includes a first anode component and a second anode component. At least a lower end portion of the first anode component is exposed at a lower surface of the anode body. The second anode component communicates with the first anode component and extends inside the anode body. The second anode component has a width greater than the width of the first anode component at least in a direction along the lower surface of the anode body. The dielectric layer is formed on part of a surface of the anode body that is in a region different from a region where the anode body contacts the anode member. The anode terminal is electrically connected to the lower end portion of the first anode component, and is partially placed at a lower surface of the outer package member. The cathode terminal is electrically connected to the cathode layer at a position below the lower surface of the anode body, and is partially placed at the lower surface of the outer package member.

DETAILED DESCRIPTION OF THE EMBODIMENTS

Figure 1:
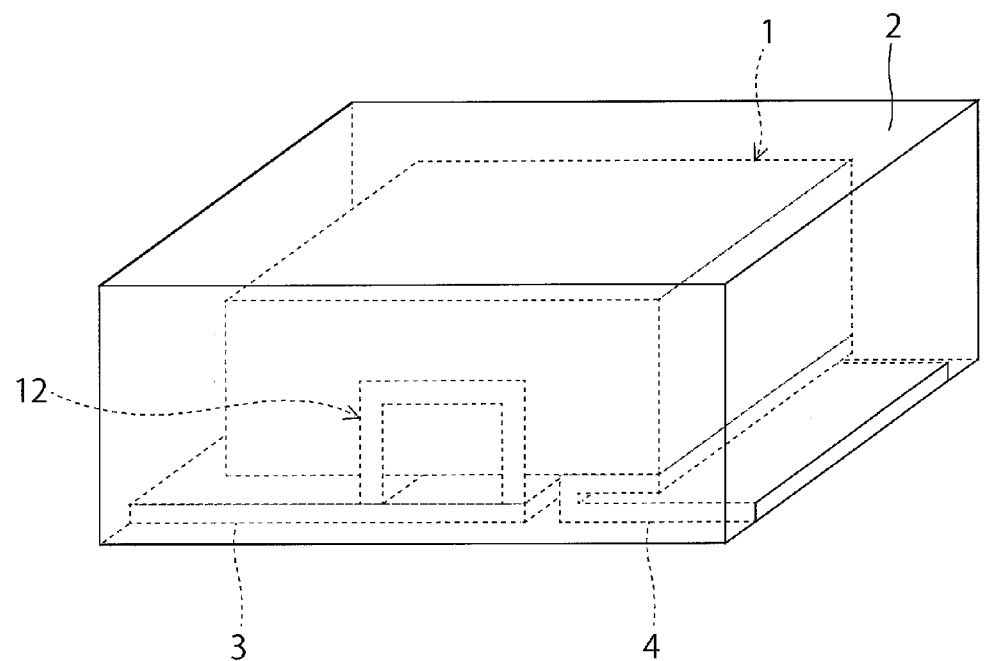
FIG. 1 is a perspective view of a solid electrolytic capacitor of an embodiment of the invention.
Figure 2:
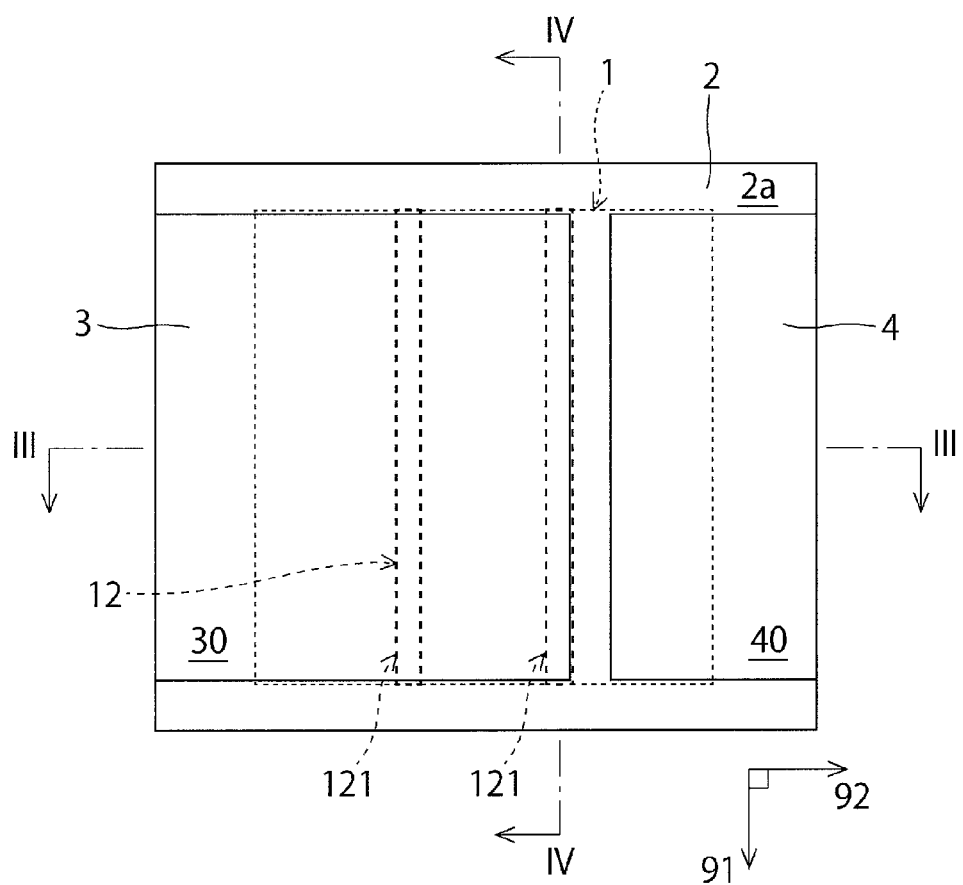
FIG. 2 is a bottom view of the solid electrolytic capacitor.

FIG. 1 is a perspective view of a solid electrolytic capacitor of an embodiment of the invention. FIG. 2 is a bottom view of the solid electrolytic capacitor. The solid electrolytic capacitor shown in FIGS. 1 and 2 includes a solid electrolytic capacitor element 1, an outer package member 2 covering the capacitor element 1, an anode terminal 3, and a cathode terminal 4. The outer package member 2 is made of resin such as an epoxy resin.

Figure 3:
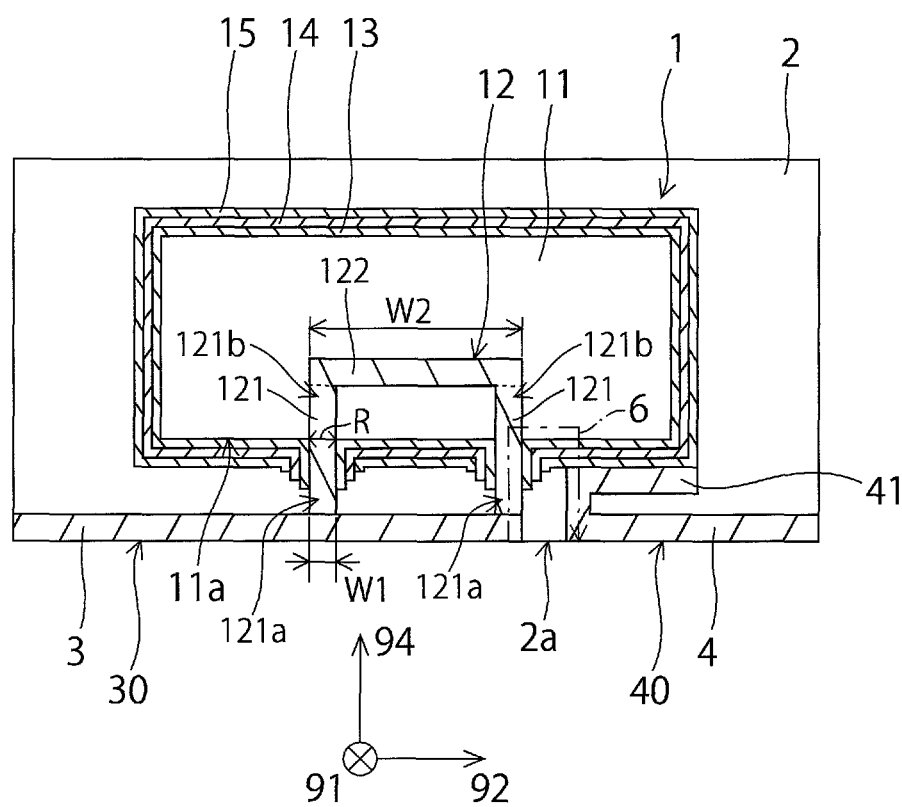
FIG. 3 is a sectional view taken along line III-III of FIG. 2.
Figure 4:
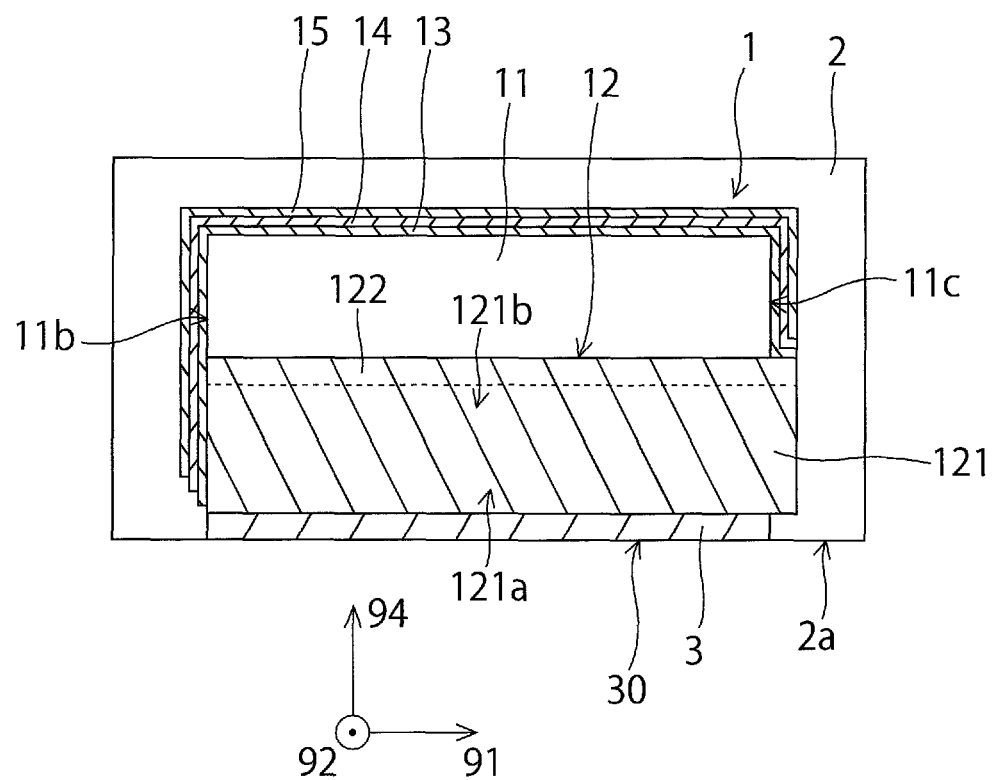
FIG. 4 is a sectional view taken along line IV-IV of FIG. 2.

FIGS. 3 and 4 are sectional views taken along lines III-III and IV-IV of FIG. 2 respectively. As shown in FIGS. 3 and 4, the capacitor element 1 has an anode body 11 in the form of a rectangular parallelepiped, and an anode member 12 buried in the anode body 11. The outer circumference of the anode body 11 includes a lower surface 11a (see FIG. 3), and first and second side surfaces 11b and 11c (see FIG. 4) substantially opposite each other.

The anode body 11 is composed of a porous sintered body made of a valve acting metal. The anode member 12 is made of a valve acting metal the type of which is the same as or different from the valve acting metal constituting the anode body 11. As a result, the anode body 11 and the anode member 12 are electrically connected to each other. Examples of the valve acting metal constituting the anode body 11 and the anode member 12 include tantalum, niobium, titanium, and aluminum.

As shown in FIG. 3, the anode member 12 is composed of two first anode components 121, and one second anode component 122. The first anode components 121 are each in the form of a flat plate, and are in postures substantially opposite each other. More specifically, the first anode components 121 each extend between the first and second side surfaces 11b and 11c of the anode body 11 as shown in FIG. 4, while extending in a first direction 94 (vertical direction in the plane of FIG. 3) substantially perpendicular to the lower surface 11a of the anode body 11 as shown in FIG. 3. Further, as shown in FIG. 3, lower end portions 121a of the first anode components 121 project from the lower surface 11a of the anode body 11, while upper end portions 121b of the first anode components 121 are placed at a predetermined depth in the anode body 11. In addition, the first anode components 121 are spaced apart from each other in a second direction 92 (horizontal direction in the plane of FIG. 3) substantially perpendicular to an extension direction 91 in which the first anode components 121 extend between the first and second side surfaces 11b and 11c. As a result, the lower end portions 121a of the first anode components 121 are exposed at the lower surface 11a of the anode body 11.

The second anode component 122 is in the form of a flat plate. The second anode component 122 extends between the first and second side surfaces 11b and 11c of the anode body 11 as shown in FIG. 4, while extending in the second direction 92 along the lower surface 11a of the anode body 11 as shown in FIG. 3. Further, as shown in FIG. 3, the opposite end portions of the second anode component 122 communicate with the respective upper end portions 121b of the first anode components 121. As a result, the first anode components 121 are electrically connected to each other in the anode body 11 through the second anode component 122.

As shown in FIG. 3, a width W2 of the second anode component 122 in the second direction 92 is greater than a width W1 of each of the first anode components 121 in the second direction 92. So, the sectional area of the anode member 12 along the lower surface 11a of the anode body 11 is greater at the second anode component 122 than at each of the first anode components 121.

As shown in FIGS. 3 and 4, a dielectric layer 13 is formed on part of the outer circumference of the anode body 11 that is in a region different from regions R where the first anode components 121 are exposed (see FIG. 3), namely on part of a surface of the anode body 11 that is in a region different from a region where the anode body 11 contacts the anode member 12. The dielectric layer 13 is formed by electrochemically oxidizing the outer circumference of the anode body 11. In the embodiment, part of the dielectric layer 13 is also formed on surfaces of the roots of the lower end portions 121a.

Also, as shown in FIGS. 3 and 4, an electrolyte layer 14 is formed on the dielectric layer 13, and a cathode layer 15 is formed on the electrolyte layer 14. The electrolyte layer 14 is made of an electrolyte material that can be solidified on the dielectric layer 13. The electrolyte material may be a conductive inorganic material such as manganese dioxide, or a conductive organic material such as TCNQ (tetracyano-quinodimethane) complex salt and conductive polymer. The cathode layer 15 is composed of a carbon layer (not shown) formed on the electrolyte layer 14, and a silver paint layer (not shown) formed on the carbon layer. The electrolyte layer 14 and the cathode layer 15 are electrically connected to each other.

As shown in FIG. 3, the anode and cathode terminals 3 and 4 are buried in the outer package member 2, and are spaced apart from each other in the second direction 92. The anode terminal 3 is electrically connected to the lower end portions 121a of the first anode components 121, whereas the cathode terminal 4 is electrically connected to the cathode layer 15 at a position below the lower surface 11a of the anode body 11. Electrical connection between the anode terminal 3 and each of the lower end portions 121a is formed by performing welding on surfaces of the anode terminal 3 and each of the lower end portions 121a contacting each other. An end portion of the cathode terminal 4 closer to the anode terminal 3 is provided with a bent part 41 in the form of an inverted L. The bent part 41 is formed by deforming the cathode terminal 4 by bending. The bent part 41 and the cathode layer 15 are electrically connected to each other through a conductive adhesive agent (not shown) provided therebetween.

Part of a surface of the anode terminal 3 and part of a surface of the cathode terminal 4 are exposed at a lower surface 2a of the outer package member 2. These exposed surfaces of the anode and cathode terminals 3 and 4 form anode and cathode terminal surfaces 30 and 40 of the solid electrolytic capacitor respectively. Like the arrangement of the anode and cathode terminals 3 and 4 relative to each other, the anode and cathode terminal surfaces 30 and 40 of the embodiment are spaced apart from each other in the second direction 92.

A method of manufacturing the aforementioned solid electrolytic capacitor is described in detail next by referring to drawings. The manufacturing method includes an element forming step, an element mounting step, an outer package forming step, and a cutting step performed in this order. The element forming step is a step of forming the capacitor element 1, and which includes an anode forming step, a dielectric layer forming step, an electrolyte layer forming step, a cathode layer forming step, and a peeling step performed in this order.

Figure 5:
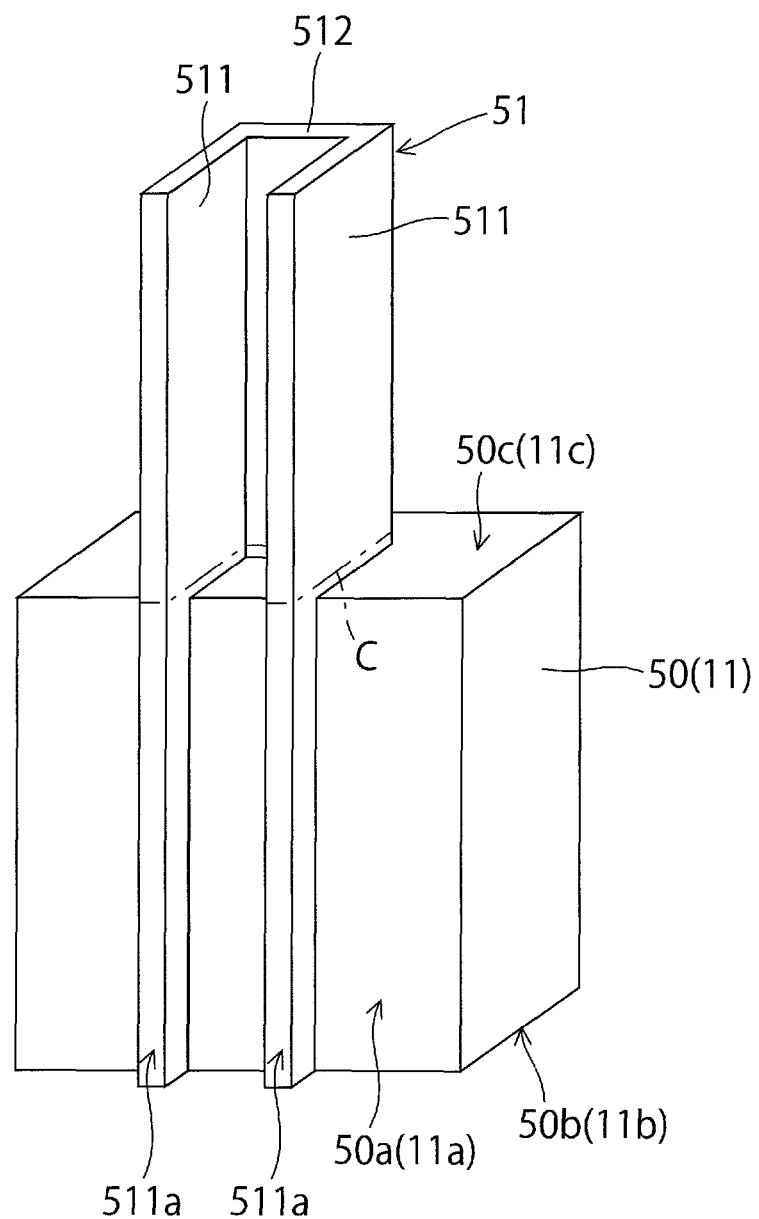
FIG. 5 is a perspective view used to explain an anode forming step that is part of a method of manufacturing the solid electrolytic capacitor.

FIG. 5 is a perspective view used to explain the anode forming step. As shown in FIG. 5, in the anode forming step, a powder molded body 50 to become the anode body 11 is prepared. The powder molded body 50 is made of powder of a valve acting metal. A metallic member 51 to become the anode member 12 is provided at a predetermined position of the powder molded body 50. More specifically, the powder is poured in a die of a predetermined shape (not shown) and part of the metallic member 51 is inserted into the die, and thereafter, pressure is applied to the die to press the powder into a solid form.

In the anode forming step, the powder is pressed into a solid form such that the powder molded body 50 is formed into a rectangular parallelepiped, more specifically that the powder molded body 50 is given an outer circumference with a first molded surface 50a to become the lower surface 11a of the anode body 11, and second and third molded surfaces 50b and 50c to become the first and second side surfaces 11b and 11c of the anode body 11 respectively. The metallic member 51 is composed of two first metallic parts 511 to become the first anode components 121, and a second metallic part 51 to become the second anode component 122. Further, the metallic member 51 is provided to the powder molded body 50 such that the metallic member 51 extends from the second molded surface 50b through the third molded surface 50c to a position above the third molded surface 50c, and that edge portions 511a of the first metallic parts 511 to become the lower end portions 121a of the first anode components 121 project from the first molded surface 50a of the powder molded body 50.

In the anode forming step, the powder molded body 50 is sintered by burning the powder molded body 50 and the metallic member 51 together at a predetermined temperature. As a result, the powder molded body 50 becomes a porous sintered body to form the anode body 11.

Figure 6:
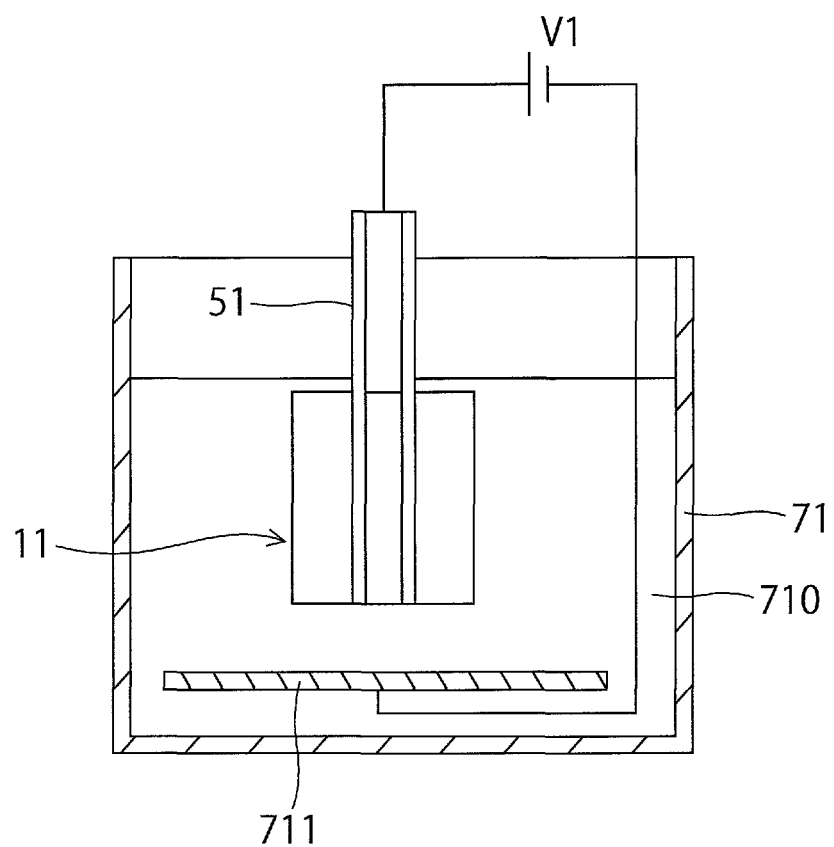
FIG. 6 is a view used to explain a dielectric layer forming step that is part of the manufacturing method.

FIG. 6 is a view used to explain the dielectric layer forming step. As shown in FIG. 6, in the dielectric layer forming step, a processing bath 71 filled with an electrolytic solution 710 is prepared first. A cathode plate 711 is provided in the electrolytic solution 710. A solution such as a phosphorus acid solution and an adipic acid solution is used as the electrolytic solution 710. Next, as shown in FIG. 6, the anode body 11 is dipped in the electrolytic solution 710, and thereafter, a voltage V1 is applied between the metallic member 51 and the cathode plate 711 to cause a current to flow in the anode body 11. In response, the outer circumference of the anode body 11 is electrochemically oxidized to form an oxide film to become the dielectric layer 13 on the outer circumference of the anode body 11. At this time, an oxide film is also formed on part of an exposed surface of the metallic member 51 that is in a region dipped in the electrolytic solution 710.

Next, in the electrolyte layer forming step, a conductive precoat layer (not shown) is formed on the dielectric layer 13. The precoat layer is made of a conductive material such as a conductive polymer, and is formed by chemical polymerization.

Figure 7:
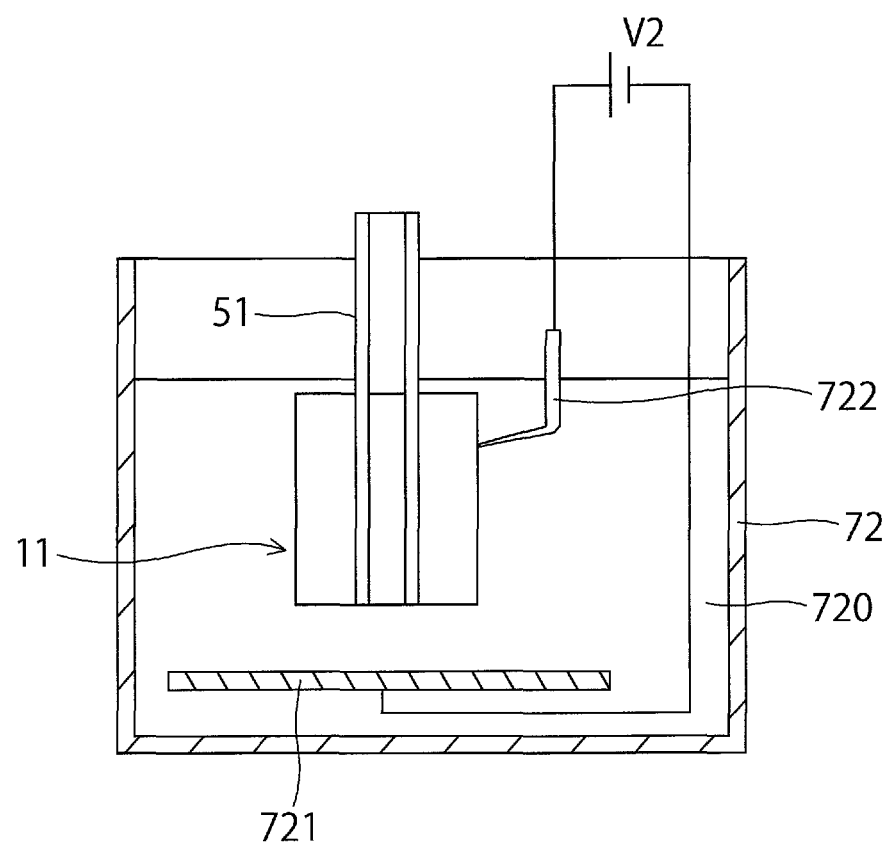
FIG. 7 is a view used to explain an electrolyte layer forming step that is part of the manufacturing method.

In the electrolyte layer forming step, a processing bath 72 filled with an electropolymerization solution 720 is further prepared as shown in FIG. 7. A cathode plate 721 is provided in electropolymerization solution 720. The electropolymerization solution 720 is made of a conductive organic material such as monomer to become a conductive polymer. Next, the anode body 11 is dipped in the electropolymerization solution 720. Then, an external electrode 722 is caused to electrically contact the precoat layer in the electropolymerization solution 720, and a voltage V2 is applied between the external electrode 722 and the cathode plate 721. In response, a current flows in the precoat layer to form an electropolymerized film on the precoat layer. As a result, the electrolyte layer 14 with the precoat layer and the electropolymerized film is formed on the dielectric layer 13.

In the cathode layer forming step, the anode body 11 is first dipped in a carbon paste to form a carbon layer (not shown) on the electrolyte layer 14. Next, the anode body 11 is dipped in a silver paste to form a silver paint layer (not shown) on the carbon layer. As a result, the cathode layer 15 with the carbon layer and the silver paint layer is formed on the electrolyte layer 14.

In the peeling step, laser is applied to parts of the dielectric layer 13, the electrolyte layer 14, and the cathode layer 15 existing on surfaces of the edge portions 511a of the first metallic parts 511 (see FIG. 5). This peels off the dielectric layer 13, the electrolyte layer 14, and the cathode layer 15 on these surfaces to expose surfaces of the first metallic parts 511. Then, the metallic member 51 is cut along line C of FIG. 5. As a result, part of the metallic member 51 remaining on the anode body 11 becomes the anode member 12 to finish formation of the capacitor element 1.

Figure 8:
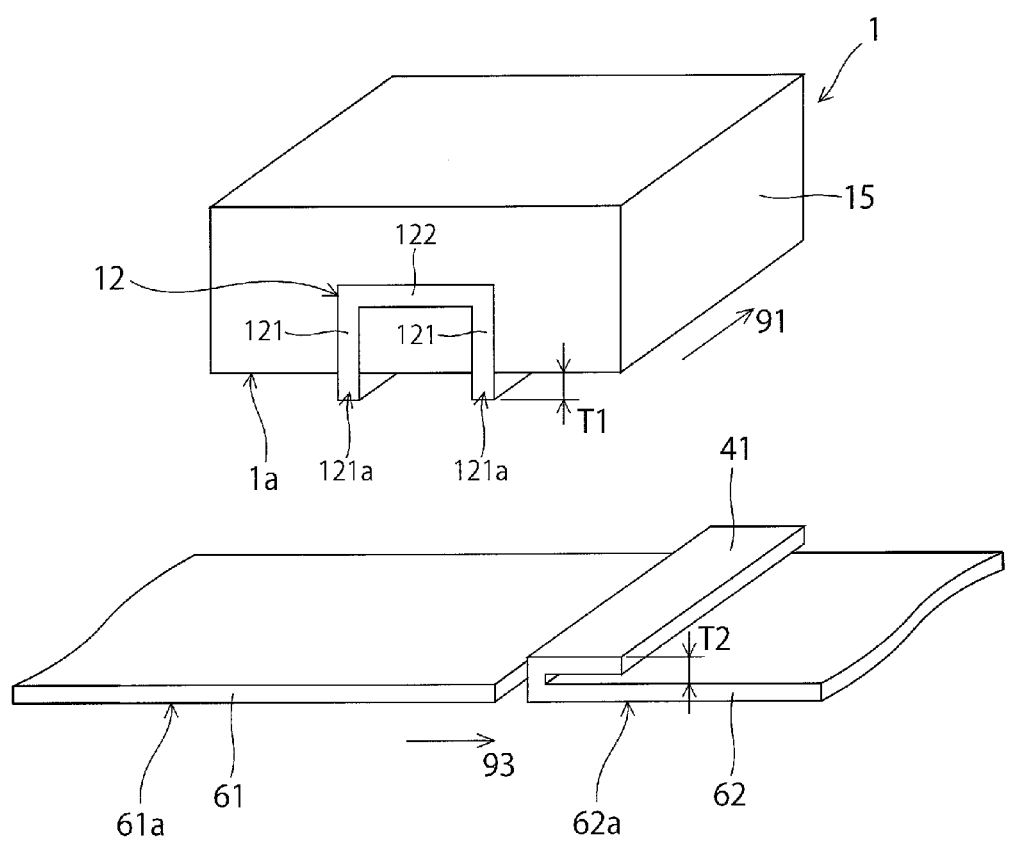
FIG. 8 is a perspective view used to explain a first stage of an element mounting step that is part of the manufacturing method.
Figure 9:
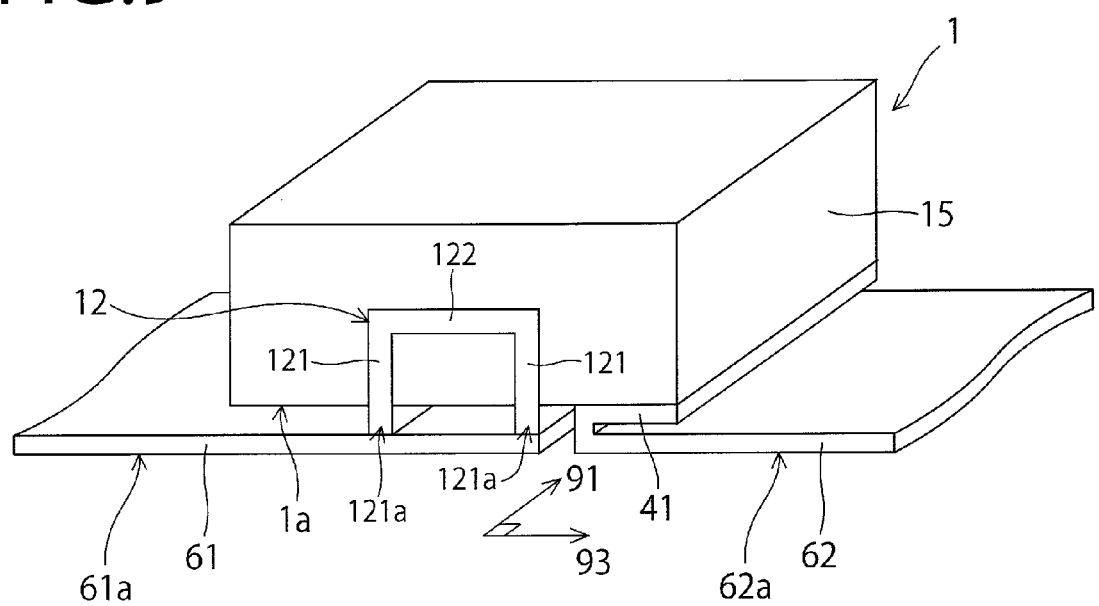
FIG. 9 is a perspective view used to explain a second stage of the element mounting step that is part of the manufacturing method;_

FIGS. 8 and 9 are perspective views used to explain first and second stages of the element mounting step respectively. First, in the element mounting step, anode and cathode frames 61 and 62 to become the anode and cathode terminals 3 and 4 respectively are prepared as shown in FIG. 8. The anode and cathode frames 61 and 62 are spaced apart from each other in a predetermined direction 93, and lower surfaces 61a and 62a of the anode and cathode frames 61 and 62 respectively are arranged on the same plane. An end portion of the cathode frame 62 closer to the anode frame 61 is provided with the bent part 41 in the form of an inverted L. The bent part 41 is formed by deforming the cathode frame 62 by bending. The height T2 of the bent part 41 is determined such that a degree of projection T1 of each of the first anode components 121 from a lower surface 1a of the capacitor element 1 is substantially the same as a sum of the height T2 and the thickness of a conductive adhesive agent (not shown) to be provided between the bent part 41 and the cathode layer 15.

Next, the capacitor element 1 is mounted on the anode and cathode frames 61 and 62 in the following manner as shown in FIG. 9. The lower surface 1a of the capacitor element 1 faces the frames 61 and 62, and the extension direction 91 of the first anode components 121 is substantially perpendicular to the direction 93 in which the anode and cathode frames 61 and 62 are aligned. The first anode components 121 face the anode frame 61. Further, part of the lower surface 1a of the capacitor element 1 that is in a region different from regions where the first anode components 121 are provided faces the bent part 41 of the cathode frame 62. In addition, a conductive adhesive agent (not shown) is provided between surfaces of the bent part 41 and the cathode layer 15 facing each other, thereby electrically connecting the cathode frame 62 and the cathode layer 15 to each other.

The degree of projection T1 of each of the first anode components 121 (see FIG. 8) is substantially the same as a sum of the height T2 of the bent part 41 and the thickness of the aforementioned conductive adhesive agent. So, mounting the capacitor element 1 makes the lower end portions 121a of the first anode components 121 contact the anode frame 61. In the element mounting step, electrical connection between the anode terminal 3 and each of the lower end portions 121a is formed by performing welding on surfaces of the anode terminal 3 and each of the lower end portions 121a contacting each other.

Figure 10:
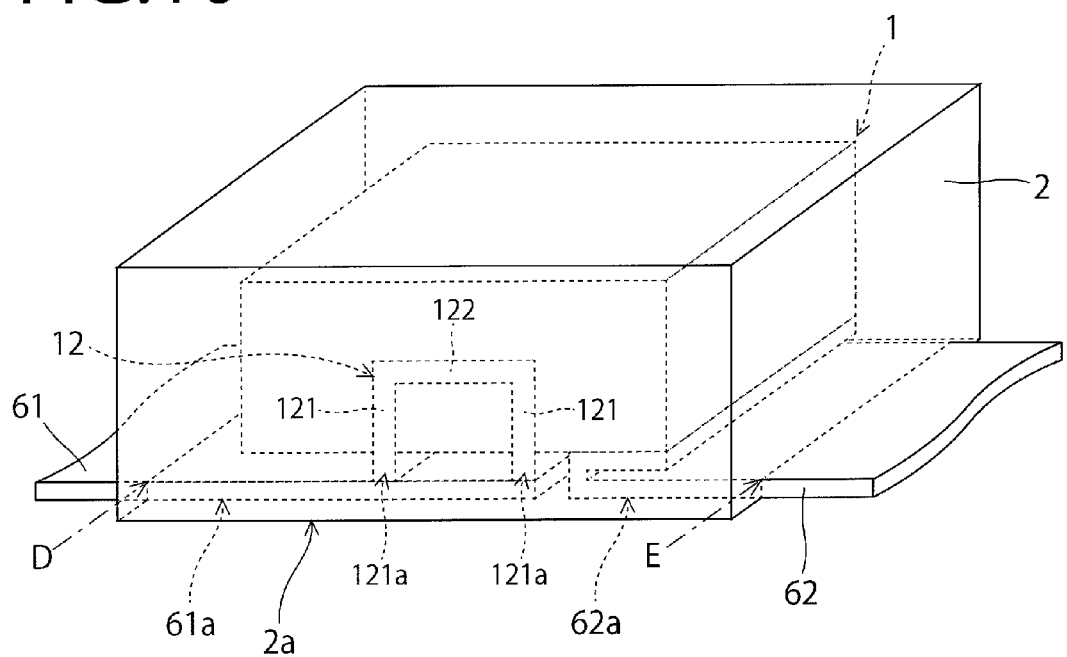
FIG. 10 is a perspective view used to explain an outer package forming step that is part of the manufacturing method.

FIG. 10 is a perspective view used to explain the outer package forming step. In the outer package forming step shown in FIG. 10, the capacitor element 1 is covered with the outer package member 2 by using a molding technique. At this time, the lower surfaces 61a and 62a of the anode and cathode frames 61 and 62 respectively are exposed at the lower surface 2a of the outer package member 2. Resin such as an epoxy resin is used to form the outer package member 2.

In the cutting step, the anode and cathode frames 61 and 62 are cut at positions D and E respectively shown in FIG. 10. As a result, part of the anode frame 61 left in the outer package member 2 becomes the anode terminal 3, and part of the cathode frame 62 left in the outer package member 2 becomes the cathode terminal 4 to finish formation of the solid electrolytic capacitor.

In the solid electrolytic capacitor described above, the parts of the surfaces of the anode and cathode terminals 3 and 4 are exposed at the lower surface 2a of the outer package member 2. These exposed surfaces of the anode and cathode terminals 3 and 4 form the anode and cathode terminal surfaces 30 and 40 of the solid electrolytic capacitor respectively. Further, this solid electrolytic capacitor is given a current path 6 extending from the anode terminal surface 30 through the anode member 12 to the cathode terminal surface 40 as shown in FIG. 3.

Figure 19:
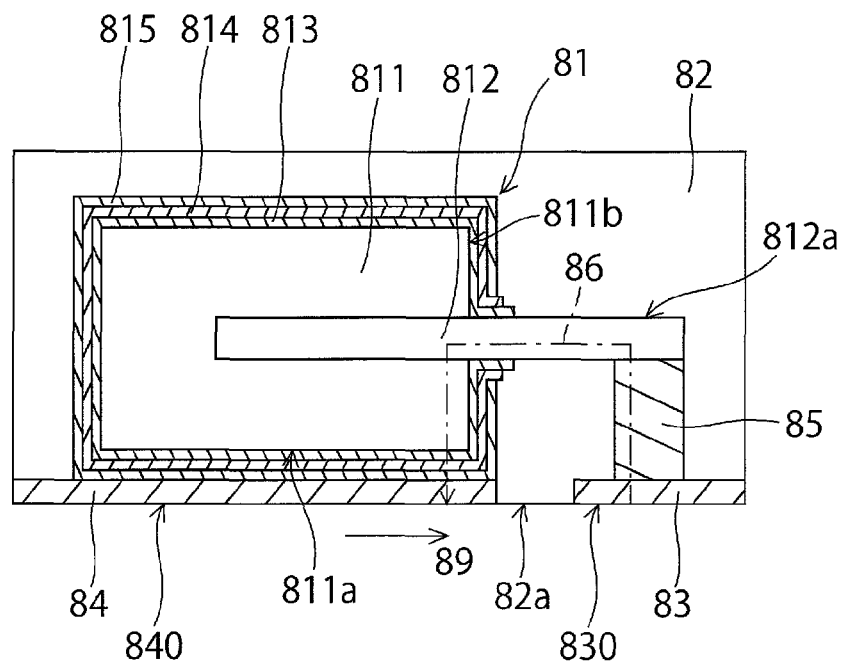
FIG. 19 is a sectional view of an example of a conventional solid electrolytic capacitor.

In the aforementioned solid electrolytic capacitor, the lower end portions 121a of the first anode components 121 project from the lower surface 11a of the anode body 11. This places the exposed portion (lower end portions 121a of the first anode components 121) of the anode member 12 at a position below the lower surface 11a of the anode body 11 to shorten a distance of the exposed portion to the lower surface 2a of the outer package member 2. Thus, in this solid electrolytic capacitor, a distance of the exposed portion to the anode terminal surface 30 is shorter than a corresponding distance in the conventional solid electrolytic capacitor shown in FIG. 19, thereby making the current path 6 shorter. As a result, the solid electrolytic capacitor achieves reduction of ESL and/or reduction of ESR.

In the aforementioned solid electrolytic capacitor, the sectional area of the anode member 12 along the lower surface 11a of the anode body 11 is greater at the second anode component 122 than at each of the first anode components 121. So, this solid electrolytic capacitor increases a contact area between the anode body 11 and the anode member 12 significantly, compared to a solid electrolytic capacitor of a structure where the aforementioned sectional area of the anode member 12 is the same at each of the first components 121 and the second anode component 122, or smaller at the second anode component 122 than at each of the first anode components 121. This reduces electrical resistance to be generated between the anode body 11 and the anode member 12, thereby reducing the ESR of the solid electrolytic capacitor.

Further, in the aforementioned solid electrolytic capacitor, the anode member 12 includes the two first anode components 121 that are electrically connected to each other in the anode body 11 through the second anode component 122 communicating with the first anode components 121. So, compared to a solid electrolytic capacitor of a structure where the anode member 12 includes only one first anode component 121, this solid electrolytic capacitor increases a total contact area between the first anode components 121 and the anode body 11 and/or a contact area between the second anode component 122 and the anode body 11 as a result of a larger number of the first anode components 121. As a result, a contact area between the anode body 11 and the anode member 12 is increased to achieve further reduction of the ESR of the solid electrolytic capacitor.

The structure of the embodiment is an example of a preferable structure, and is not intended to exclude a structure such as that of a first modification described later (FIGS. 11 and 12) where the anode member 12 includes one first anode component 121 and one second anode component 122.

In the aforementioned solid electrolytic capacitor, both the anode and cathode terminals 3 and 4 extend to the lower surface 2a of the outer package member 2 without passing through the side surfaces of the outer package member 2 to expose the parts of the surfaces of the anode and cathode terminals 3 and 4 at the lower surface 2a. So, this solid electrolytic capacitor shortens the length of a path in the anode terminal 3 between the anode terminal surface 30 and the exposed portion (lower end portions 121a of the first anode components 121) of the anode member 12, and shortens the length of a path in the cathode terminal 4 between the cathode terminal surface 40 and the cathode layer 15. As a result, the solid electrolytic capacitor achieves further reduction of ESL and/or reduction of ESR.

The structure of the embodiment is an example of a preferable structure, and is not intended to exclude a structure such as that of a fourth modification described later (FIG. 17) where the anode and cathode terminals 3 and 4 each pass through a side surface of the outer package member 2 to reach the lower surface 2a of the outer package member 2.

In the aforementioned solid electrolytic capacitor, the first anode components 121 extend between the first and second side surfaces 11b and 11c of the anode body 11, so the regions R where the first anode components 121 are exposed at the lower surface 11a of the anode body 11 spread in the extension direction 91 of the first anode components 121. In this solid electrolytic capacitor, the anode and cathode terminals 3 and 4 are spaced apart from each other in the second direction 92 substantially perpendicular to the extension direction 91. So, a contact area between the exposed portion (lower end portions 121a of the first anode components 121) and the anode terminal 3 can be increased by making the anode terminal 3 spread further in the extension direction 91. Increasing this contact area reduces electrical resistance to be generated between the anode member 12 and the anode terminal 3. As a result, the solid electrolytic capacitor achieves further reduction of ESR.

Figure 16:
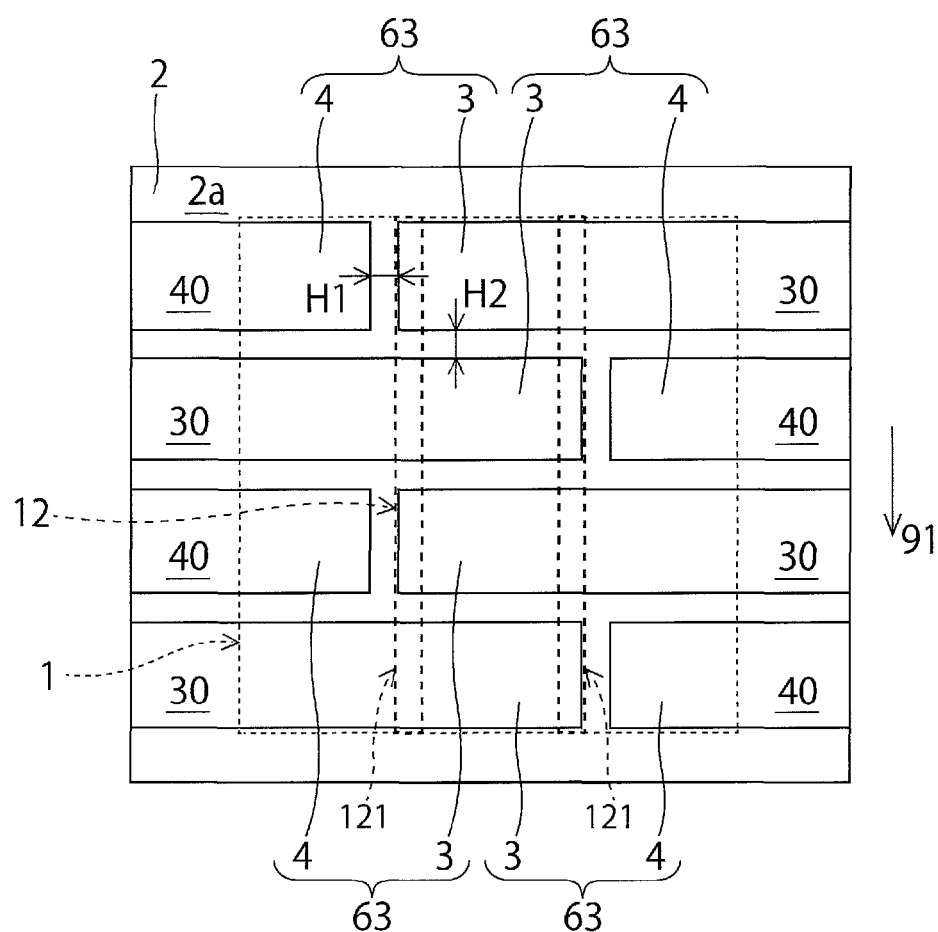
FIG. 16 is a bottom view of a third modification of the solid electrolytic capacitor.

If the anode and cathode terminals 3 and 4 are spaced apart from each other in a direction substantially the same as the extension direction 91 of the first anode components 121, connection between the anode terminal 3 and the anode member 12 may be limited only to part of the exposed portion (lower end portions 121a of the first anode components 121). However, the aforementioned solid electrolytic capacitor is free from such limitations, and allows the anode terminal 3 to be connected to the entire exposed portion of the anode member 12. As a result, design of the anode and cathode terminals 3 and 4 including arrangement of the anode and cathode terminals 3 and 4, and connections between the anode and cathode terminals 3 and 4 and the capacitor element 1, can be made with a high degree of freedom. As an example, the anode and cathode terminals 3 and 4 can be designed in a manner shown in a third modification described later (FIG. 16).

The structure of the embodiment is an example of a preferable structure, and is not intended to exclude a structure such as that of a second modification described later (FIG. 13) where the anode and cathode terminals 3 and 4 are spaced apart from each other in a direction substantially the same as the extension direction 91 of the first anode components 121.

Also, in the aforementioned solid electrolytic capacitor, the lower end portions 121a of the first anode components 121 project from the lower surface 11a of the anode body 11. This makes it possible to easily form electrical connection between the exposed portion (lower end portions 121a of the first anode components 121) and the anode terminal 3 during the manufacturing process of the solid electrolytic capacitor.

Figure 11:
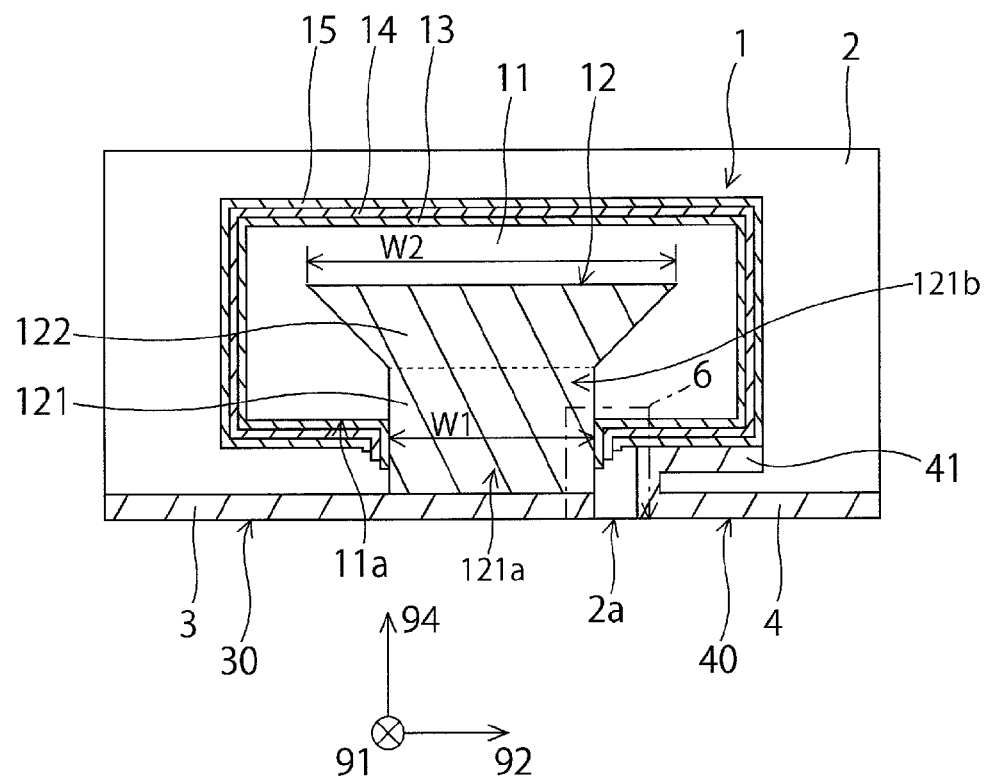
FIG. 11 is a sectional view of a first modification of the solid electrolytic capacitor.
Figure 12:
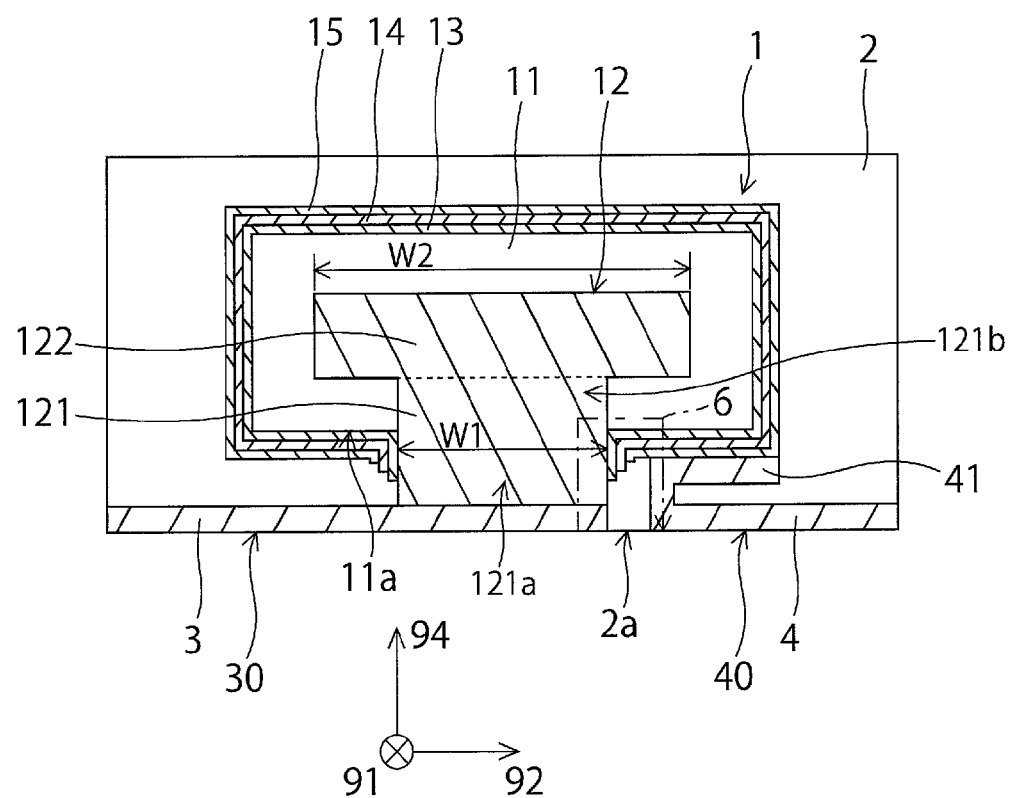
FIG. 12 is a sectional view of another example of the solid electrolytic capacitor of the first modification.

FIG. 11 is a sectional view of the first modification of the aforementioned solid electrolytic capacitor. FIG. 12 is a sectional view of another example of the solid electrolytic capacitor of the first modification. As shown in each of FIGS. 11 and 12, the anode member 12 may include one first anode component 121 and one second anode component 122. The lower end portion 121a of the first anode component 121 projects from the lower surface 11a of the anode body 11, and the second anode component 122 communicates with the upper end portion 121b of the first anode component 121. The first and second anode components 121 and 122 each extend between the first and second side surfaces 11b and 11c of the anode body 11 (see FIG. 4).

Further, as shown in each of FIGS. 11 and 12, the second anode component 122 is provided inside the anode body 11, and extends in the second direction 92 (horizontal direction in the plane of each of FIGS. 11 and 12) substantially perpendicular to the extension direction 91 of the first anode component 121. The width W2 of the second anode component 122 in the second direction 92 is greater than the width W1 of the first anode component 121 in the second direction 92. In the solid electrolytic capacitor shown in FIG. 11, the second anode component 122 has a shape that extends more widely from its lower end position toward its top. So, the width W2 of the second anode component 122 increases gradually in a direction from the lower end position toward the upper end position of the second anode component 122. Meanwhile, in the solid electrolytic capacitor shown in FIG. 12, the width W2 of the second anode component 122 is substantially the same at any positions from the lower end position to the upper end position of the second anode component 122.

Like in the aforementioned solid electrolytic capacitor (FIG. 3), the lower end portion 121a of the first anode component 121 projects from the lower surface 11a of the anode body 11 in the solid electrolytic capacitor of the first modification. This places the exposed portion (lower end portion 121a of the first anode component 121) of the anode member 12 at a position below the lower surface 11a of the anode body 11 to shorten a distance of the exposed portion to the lower surface 2a of the outer package member 2. Thus, in the solid electrolytic capacitor of the first modification, a distance of the exposed portion to the anode terminal surface 30 is shorter than a corresponding distance in the conventional solid electrolytic capacitor shown in FIG. 19, thereby making the current path 6 (see each of FIGS. 11 and 12) shorter. As a result, the solid electrolytic capacitor achieves reduction of ESL and/or reduction of ESR.

Also, in the solid electrolytic capacitor of the first modification, the second anode component 122 communicates with the first anode component 121 while extending inside the anode body 11. Further, the width W2 of the second anode component 122 is greater than the width W1 of the first anode component 121. So, compared to a solid electrolytic capacitor of a structure where the respective widths W2 and W1 of the second and first anode components 122 and 121 are the same, the solid electrolytic capacitor of the first modification increases a contact area between the anode body 11 and the anode member 12 as a result of the greater width W2 of the second anode component 122. This reduces electrical resistance to be generated between the anode body 11 and the anode member 12, thereby reducing the ESR of the solid electrolytic capacitor.

Figure 13:
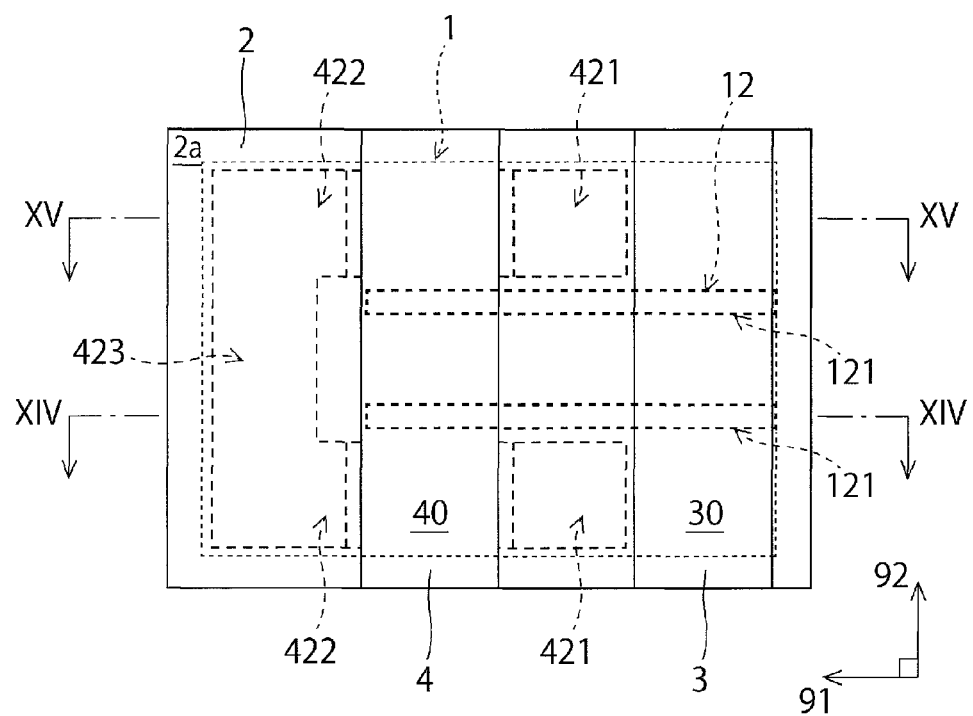
FIG. 13 is a bottom view of a second modification of the solid electrolytic capacitor.
Figure 14:
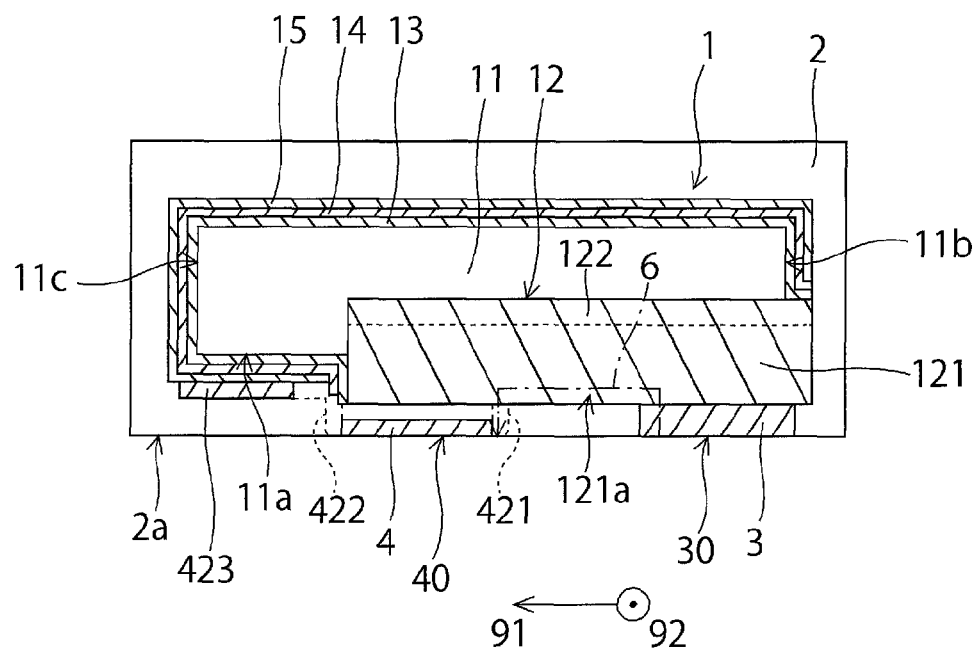
FIG. 14 is a sectional view taken along line XIV-XIV of FIG. 13.
Figure 15:
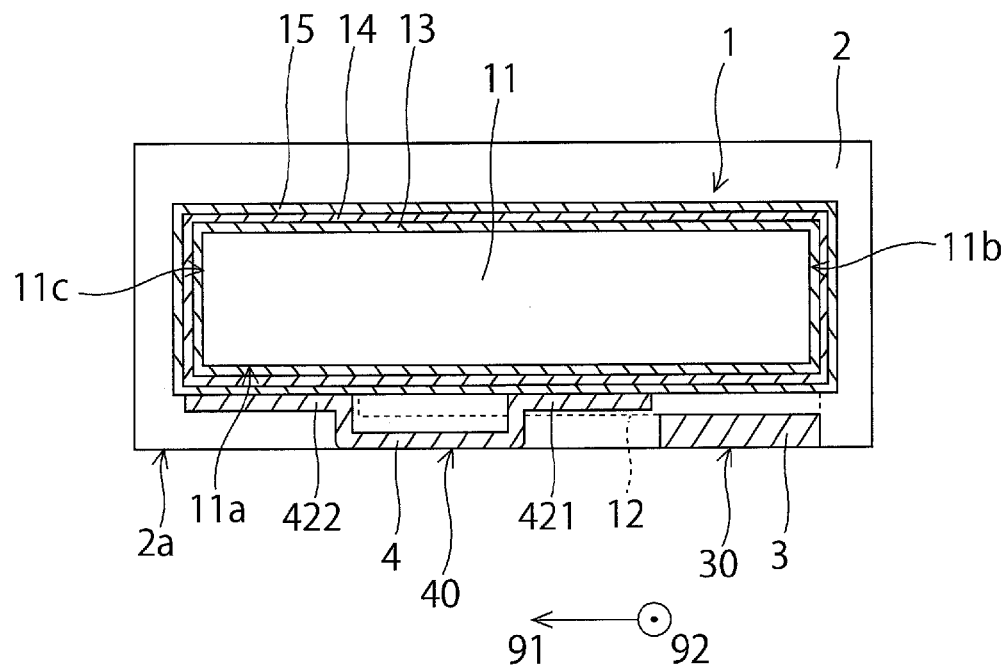
FIG. 15 is a sectional view taken along line XV-XV of FIG. 13.

FIG. 13 is a bottom view of the second modification of the aforementioned solid electrolytic capacitor. FIGS. 14 and 15 are sectional views taken along lines XIV-XIV and XV-XV of FIG. 13 respectively. In the aforementioned solid electrolytic capacitor, the anode and cathode terminals 3 and 4 may be spaced apart from each other in a direction substantially the same as the extension direction 91 of the first anode components 121 as shown in FIGS. 13 and 14.

As shown in FIG. 14, the first anode components 121 and the second anode component 122 constituting the anode member 12 each extend from the first side surface 11b to a predetermined position toward the second side surface 11c of the anode body 11, but do not reach the second side surface 11c. Further, the lower end portions 121a of the first anode components 121 project from the lower surface 11a of the anode body 11. The anode terminal 3 extends in the second direction 92 (vertical direction in the plane of FIG. 13) substantially perpendicular to the extension direction 91 as shown in FIG. 13. Further, the anode terminal 3 is electrically connected to the lower end portions 121a of the first anode components 121 in positions near the first side surface 11b of the anode body 11 as shown in FIG. 14.

The cathode terminal 4 is spaced apart from the anode terminal 3 in the extension direction 91, and which extends substantially parallel to the anode terminal 3 as shown in FIG. 13. The cathode terminal 4 is spaced below the anode member 12 as shown in FIG. 14. Further, as shown in FIGS. 13 and 15, an outer periphery of the cathode terminal 4 closer to the anode terminal 3 is provided with first electrical connections 421 placed at two positions on the outer periphery between which the anode member 12 is placed. The first electrical connections 421 are each in the form of an inverted L, and extend toward the anode terminal 3. An outer periphery of the cathode terminal 4 farther from the anode terminal 3 is provided with second electrical connections 422 placed at two positions on the outer periphery between which the anode member 12 is placed. The second electrical connections 422 are each in the form of an inverted L, and extend in a direction away from the anode terminal 3. The second electrical connections 422 are coupled to each other through a coupling part 423.

The first electrical connections 421, the second electrical connections 422, and the coupling part 423 are each electrically connected to the cathode layer 15 at a position below the lower surface 11a of the anode body 11 as shown in FIGS. 14 and 15. This makes electrical connection of the cathode terminal 4 to the cathode layer 15 through the first electrical connections 421, the second electrical connections 422, and the coupling part 423.

In the solid electrolytic capacitor of the second modification, part of a surface of the anode terminal 3 and part of a surface of the cathode terminal 4 are exposed at the lower surface 2a of the outer package member 2. These exposed surfaces of the anode and cathode terminals 3 and 4 form the anode and cathode terminal surfaces 30 and 40 of the solid electrolytic capacitor respectively. Further, this solid electrolytic capacitor is given a current path 6 extending from the anode terminal surface 30 through the anode member 12 to the cathode terminal surface 40 as shown in FIG. 14.

Like in the aforementioned solid electrolytic capacitor (FIG. 3), the lower end portions 121a of the first anode components 121 project from the lower surface 11a of the anode body 11 in the solid electrolytic capacitor of the second modification. This places the exposed portion (lower end portions 121a of the first anode components 121) of the anode member 12 at a position below the lower surface 11a of the anode body 11 to shorten a distance of the exposed portion to the lower surface 2a of the outer package member 2. Thus, in the solid electrolytic capacitor of the second modification, a distance of the exposed portion to the anode terminal surface 30 is shorter than a corresponding distance in the conventional solid electrolytic capacitor shown in FIG. 19, thereby making the current path 6 shorter. As a result, the solid electrolytic capacitor achieves reduction of ESL and/or reduction of ESR.

Like in the aforementioned solid electrolytic capacitor (FIG. 3), the sectional area of the anode member 12 along the lower surface 11a of the anode body 11 is greater at the second anode component 122 than at each of the first anode components 121 in the solid electrolytic capacitor of the second modification. So, the solid electrolytic capacitor of the second modification increases a contact area between the anode body 11 and the anode member 12 significantly, compared to a solid electrolytic capacitor of a structure where the aforementioned sectional area of the anode member 12 is the same at each of the first anode components 121 and the second anode component 122, or smaller at the second anode component 122 than at each of the first anode components 121. This reduces electrical resistance to be generated between the anode body 11 and the anode member 12, thereby reducing the ESR of the solid electrolytic capacitor.

Further, like in the aforementioned solid electrolytic capacitor (FIG. 3), the anode member 12 includes the two first anode components 121 that are electrically connected to each other in the anode body 11 through the second anode component 122 communicating with the first anode components 121 in the solid electrolytic capacitor of the second modification. So, compared to a solid electrolytic capacitor of a structure where the anode member 12 includes only one first anode component 121, the solid electrolytic capacitor of the second modification increases a total contact area between the first anode components 121 and the anode body 11 and/or a contact area between the second anode component 122 and the anode body 11 as a result of a larger number of the first anode components 121. As a result, a contact area between the anode body 11 and the anode member 12 is increased to achieve further reduction of the ESR of the solid electrolytic capacitor.

FIG. 16 is a bottom view of the third modification of the aforementioned solid electrolytic capacitor. As shown in FIG. 16, the aforementioned solid electrolytic capacitor may include a plurality of terminal units 63 arranged in the extension direction 91 of the first anode components 121 and each of which is composed of the anode and cathode terminals 3 and 4. The arrangement of two adjacent ones of the terminal units 63 relative to each other is such that the anode terminal 3 belonging to one of the adjacent terminal units 63 and the cathode terminal 4 belonging to the other of the adjacent terminal units 63 are substantially parallel to each other.

In the solid electrolytic capacitor of the third modification, in response to application of a voltage to each of the terminal units 63, currents in opposite directions flow in the anode and cathode terminals 3 and 4 substantially parallel to each other that belong to two adjacent ones of the terminal units 63. So, magnetic fields generated by these currents cancel each other out, thereby generating current canceling effect in the solid electrolytic capacitor. As a result, the solid electrolytic capacitor of the third modification achieves further reduction of ESL.

In the solid electrolytic capacitor of the third modification, regarding two adjacent ones of the terminal units 63 relative to each other, it is preferable that a distance H1 between the anode and cathode terminals 3 and 4 belonging to each of the adjacent terminal units 63 be substantially the same as a distance H2 between the adjacent terminal units 63 as shown in FIG. 16, or smaller than the distance H2. This can make the distance H1 smaller to make the current path 6 (see FIG. 3) still shorter. As a result, the solid electrolytic capacitor achieves further reduction of ESL and/or reduction of ESR.

Figure 17:
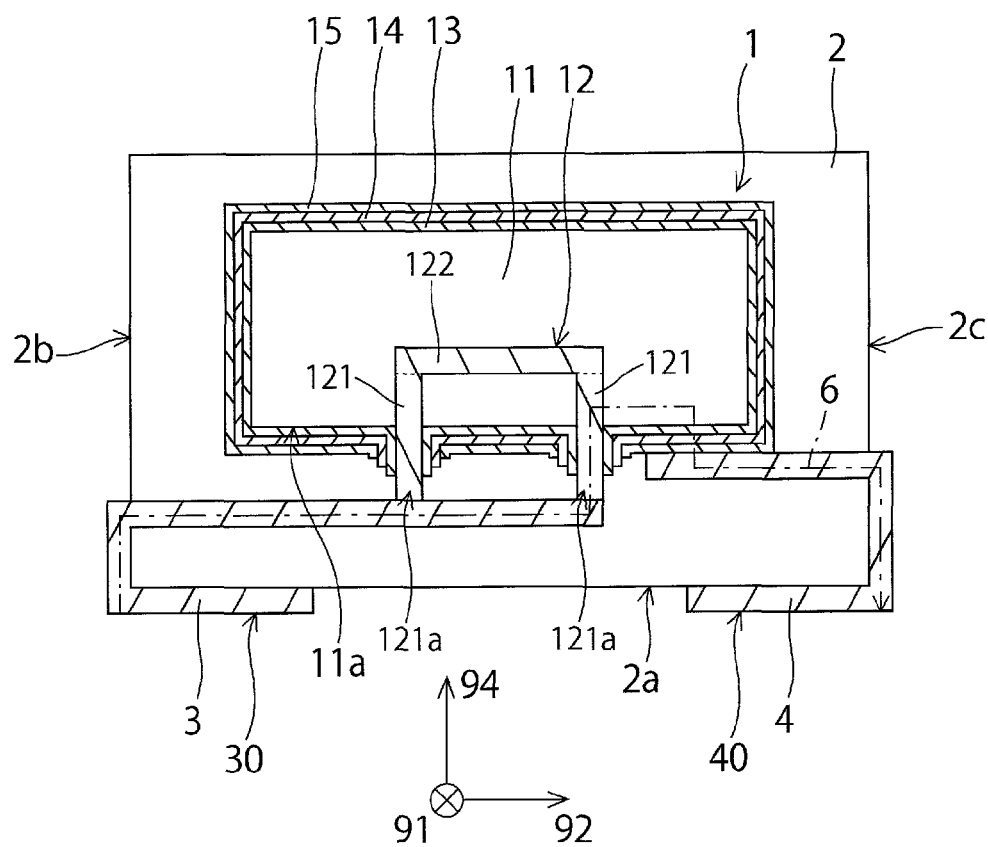
FIG. 17 is a sectional view of a fourth modification of the solid electrolytic capacitor.

FIG. 17 is a sectional view of a fourth modification of the aforementioned solid electrolytic capacitor. In the solid electrolytic capacitor, the anode and cathode terminals 3 and 4 may pass through side surfaces 2b and 2c of the outer package member 2 respectively to reach the lower surface 2a of the outer package member 2 as shown in FIG. 17. In the solid electrolytic capacitor of the fourth modification, the anode terminal 3 is pulled out of the outer package member 2 through the side surface 2b, and the cathode terminal 4 is pulled out of the outer package member 2 through the side surface 2c opposite the side surface 2b. The anode terminal 3 is bent along the side and lower surfaces 2b and 2a of the outer package member 2 to be routed to the lower surface 2a. The cathode terminal 4 is bent along the side and lower surfaces 2c and 2a of the outer package member 2 to be routed to the lower surface 2a. Thus, part of the anode terminal 3 and part of the cathode terminal 4 are placed on the lower surface 2a of the outer package member 2, and lower surfaces of these parts of the anode and cathode terminals 3 and 4 form the anode and cathode terminal surfaces 30 and 40 of the solid electrolytic capacitor respectively.

Figure 20:
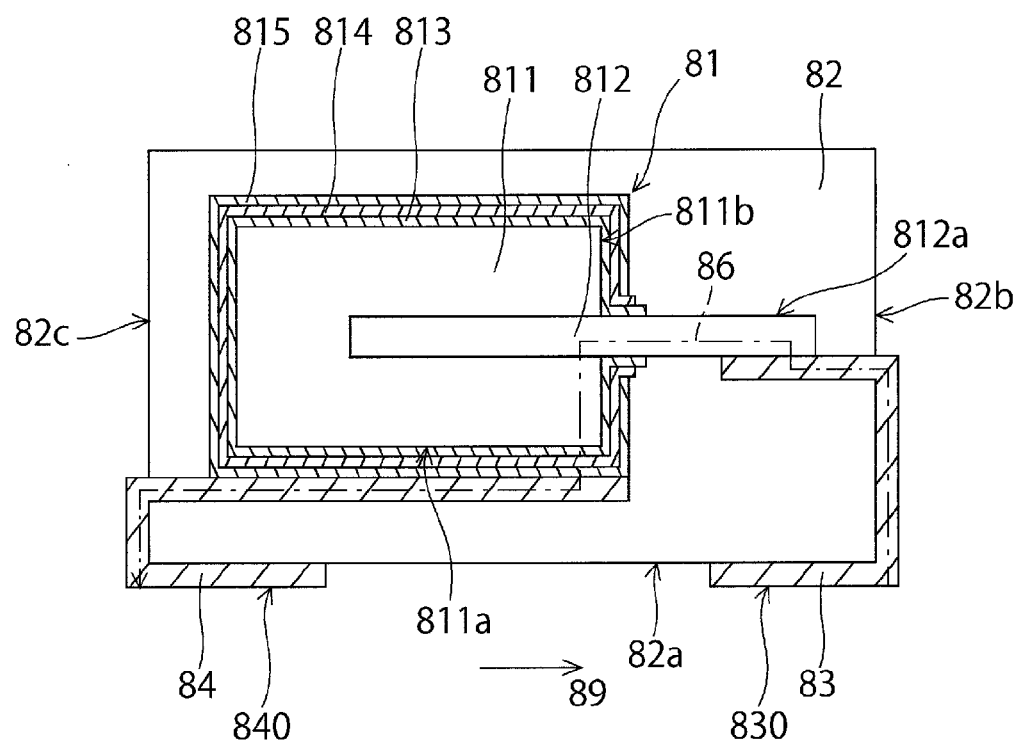
FIG. 20 is a sectional view of a different example of a conventional solid electrolytic capacitor.

Meanwhile, a conventional solid electrolytic capacitor may also have a structure such as that shown in FIG. 20. The solid electrolytic capacitor of FIG. 20 differs from the conventional solid electrolytic capacitor of FIG. 19 in that the pulled-out portion 812a of the anode lead 812 and the anode terminal 83 are electrically connected to each other while the pillow member 85 is not provided therebetween, and that the anode and cathode terminals 83 and 84 pass through side surfaces 82b and 82c of the outer package member 82 respectively to reach the lower surface 82a of the outer package member 82. Like the structure of the solid electrolytic capacitor of FIG. 19, the structure of FIG. 20 also finds difficulty in shortening the current path 86 extending from the anode terminal surface 830 through the anode lead 812 to reach the cathode terminal surface 840.

The solid electrolytic capacitor of the fourth modification makes a distance of the exposed portion (lower end portions 121a of the first anode components 121) of the anode member 12 to the anode terminal surface 30 shorter than a corresponding distance in the conventional solid electrolytic capacitor shown in FIG. 20. Thus, a current path 6 extending from the anode terminal surface 30 through the anode member 12 to the cathode terminal surface 40 is shortened, so that the solid electrolytic capacitor achieves reduction of ESL and/or reduction of ESR.

The structure of each part of the invention is not limited to that shown in the embodiment described above. Various modifications can be devised without departing from the technical scope recited in claims. By way of example, in the aforementioned solid electrolytic capacitor, the lower end portions 121a of the first anode components 121 may not project from the lower surface 11a of the anode body 11, namely, the lower end surfaces of the first anode components 121 and the lower surface 11a of the anode body 11 may be arranged on the same plane. This structure also makes a distance of the exposed portion of the anode member 12 to the anode terminal surface 30 shorter than a corresponding distance in the conventional solid electrolytic capacitor shown in FIG. 19. Thus, the current path 6 is shortened, so that the solid electrolytic capacitor achieves reduction of ESL and/or reduction of ESR. Further, design of the anode and cathode terminals 3 and 4 can be made with a high degree of freedom. Meanwhile, it is preferable that the lower end portions 121a of the first anode components 121 project from the lower surface 11a of the anode body 11. The reason therefor is as follows. The lower end portions 121a may be shifted in a direction same as or opposite the direction 93 from predetermined positions on the anode frame 61 when the capacitor element 1 is mounted on the anode and cathode frames 61 and 62 in the element mounting step (see FIGS. 8 and 9). Even in this case, if the lower end portions 121a project from the lower surface 11a of the anode body 11 as shown in FIG. 3, the anode frame 61 and the cathode layer 15 will not contact each other to prevent electrical short therebetween.

In the aforementioned electrolytic capacitor, the width W2 of the second anode component 122 may be greater than the width W1 of each of the first anode components 121 not only in one direction along the lower surface 11a of the anode body 11 (second direction 92), but also in a plurality of directions or in all directions along the lower surface 11a. In the aforementioned electrolytic capacitor, further, the anode member 12 may include three or more first anode components 121. In addition, in the aforementioned electrolytic capacitor, the anode member 12 may include two or more second components 122.

In the aforementioned solid electrolytic capacitor, the first anode components 121 and/or the second anode component 122 extend from the first side surface 11b toward the second side surface 11c of the anode body 11. Meanwhile, they may not reach the second side surface 11c. Also, the first anode components 121 may each be a metallic member in the form of a cylindrical column (such as a metal wire), or a metallic member in the form of a prism. Meanwhile, it is preferable that each of the first anode components 121 be not in the form of a cylindrical column, but in the form of a prism, specifically in the form of a quadrangular prism. The reason therefor is that this increases a contact area between the first anode components 121 and the anode terminal 3 to achieve reduction of ESR of the solid electrolytic capacitor.

Figure 18:
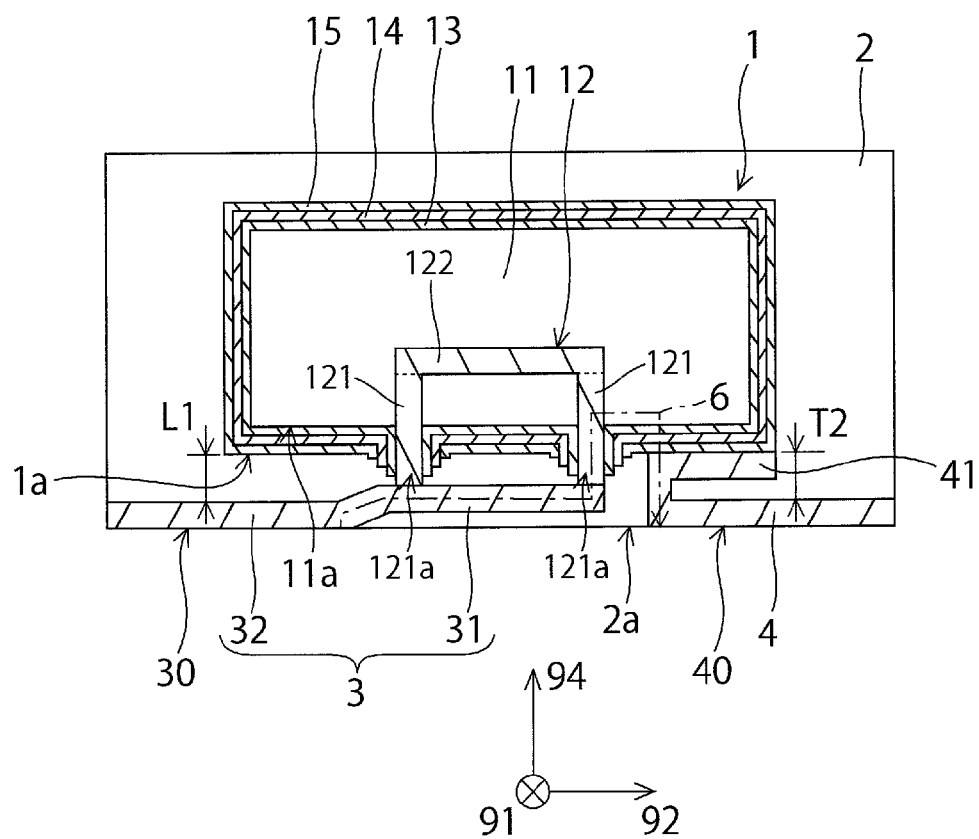
FIG. 18 is a sectional view of a different modification of the solid electrolytic capacitor.

Additionally, in the aforementioned solid electrolytic capacitor, the anode terminal 3 may include upper and lower stage parts 31 and 32 formed by deforming the anode terminal 3 into the shape of a crank by bending as shown in FIG. 18. In this structure, the upper stage part 31 has an upper surface electrically connected to the lower end portions 121a of the first anode components 121, and a lower surface covered with the outer package member 2. Further, the lower stage part 32 has a lower surface exposed at the lower surface 2a of the outer package member 2, and this exposed surface forms the anode terminal surface 30 of the solid electrolytic capacitor. In the solid electrolytic capacitor shown in FIG. 18, covering the lower surface of the upper stage part 31 with the outer package member 2 makes the anode terminal 3 less likely to be separated from the outer package member 2. In the solid electrolytic capacitor shown in FIG. 18, a distance L1 between the lower surface 1a of the capacitor element 1 and the upper surface of the lower stage part 32 is substantially the same as a sum of the height T2 of the bent part 41 of the cathode terminal 4 and the thickness of a conductive adhesive agent (not shown) provided between the bent part 41 and the cathode layer 15.

Still further, in the aforementioned solid electrolytic capacitor, part of the anode member 12 projecting from the lower surface 11a of the anode body 11, or part of the anode member 12 exposed at the lower surface 11a, may be regarded as the first anode component 121. Also, part of the anode member 12 buried in the anode body 11 may be regarded as the second anode component 122.

The invention claimed is:

1. A solid electrolytic capacitor, comprising:
a capacitor element including an anode body, an anode member buried in the anode body, a dielectric layer, an electrolyte layer formed on the dielectric layer, and a cathode layer formed on the electrolyte layer, the anode member including a first anode component and a second anode component, at least a lower end portion of the first anode component being exposed at a lower surface of the anode body, the second anode component communicating with the first anode component and extending inside the anode body, the second anode component having a width greater than the width of the first anode component at least in a direction along the lower surface of the anode body, the dielectric layer being formed on part of a surface of the anode body that is in a region different from a region where the anode body contacts the anode member;
an outer package member covering the capacitor element;
an anode terminal electrically connected to the lower end portion of the first anode component, the anode terminal partially being placed at a lower surface of the outer package member; and
a cathode terminal electrically connected to the cathode layer at a position below the lower surface of the anode body, the cathode terminal partially being placed at the lower surface of the outer package member.

2. The solid electrolytic capacitor according to claim 1, wherein the first anode component of the anode member includes a plurality of first anode components, and the first anode components are electrically connected to each other inside the anode body through the second anode component communicating with the first anode components.

3. The solid electrolytic capacitor according to claim 1, wherein the sectional area of the anode member along the lower surface of the anode body is greater at the second anode component than at the first anode component.

4. The solid electrolytic capacitor according to claim 1, wherein the first anode component extends in a predetermined direction along the lower surface of the anode body, at least the lower end portion of the first anode component is exposed at the lower surface of the anode body, and the anode and cathode terminals are spaced apart from each other in a direction substantially perpendicular to the direction in which the first anode component extends.

5. The solid electrolytic capacitor according to claim 4, wherein a plurality of terminal units is arranged in the direction in which the first anode component extends, each of the terminal units being composed of the anode and cathode terminals.

6. The solid electrolytic capacitor according to claim 1, wherein part of a surface of the anode terminal and part of a surface of the cathode terminal are exposed at the lower surface of the outer package member.

* * * * *